United States Patent [19]
Hauser

[11] Patent Number: 5,988,004
[45] Date of Patent: Nov. 23, 1999

[54] INTERNAL POWER TAKE-OFF SHAFT

[75] Inventor: Hans Hauser, Strongsville, Ohio

[73] Assignee: MTD Products Inc, Cleveland, Ohio

[21] Appl. No.: 08/929,071

[22] Filed: Sep. 15, 1997

[51] Int. Cl.[6] .................................................. F16H 37/00
[52] U.S. Cl. ................................... 74/15.63; 74/665 GL; 74/606 R
[58] Field of Search .................................. 74/15.2, 15.63, 74/665 GL, 730.1, 664, 606 L, 421, 606 R; 475/72

[56] References Cited

U.S. PATENT DOCUMENTS

| | | | |
|---|---|---|---|
| 1,487,445 | 3/1924 | Dickinson . | |
| 1,559,617 | 11/1925 | Johnston . | |
| 1,749,828 | 3/1930 | Maier . | |
| 1,849,144 | 3/1932 | Hamilton . | |
| 2,601,297 | 6/1952 | Keese | 74/15.63 X |
| 2,932,202 | 4/1960 | Rinkema | 74/15.63 X |
| 2,945,382 | 7/1960 | Ritter et al. | 74/15.63 X |
| 3,813,956 | 6/1974 | Whitecar | 74/606 R X |
| 4,464,945 | 8/1984 | Ertl | 74/15.6 |
| 4,498,349 | 2/1985 | Nishihara | 74/15.2 |
| 4,677,866 | 7/1987 | Tone | 74/15.86 |
| 4,773,277 | 9/1988 | Cook et al. | 74/15.63 X |
| 4,924,720 | 5/1990 | Shust | 74/377 |

FOREIGN PATENT DOCUMENTS

| | | | |
|---|---|---|---|
| 717803 | 9/1965 | Canada | 74/15.2 |

*Primary Examiner*—Tamara L. Graysay
*Assistant Examiner*—Marcus Charles
*Attorney, Agent, or Firm*—Emerson & Associates; Roger D. Emerson; Timothy D. Bennett

[57] ABSTRACT

A transmission is provided for use with an associated vehicle having an engine and a drive axle. The transmission has power input means for receiving power from the engine, a hydrostatic unit and first gearing means for communicating power from the power input means to the drive axle, a PTO shaft having first and second ends for use in selectively driving first and second associated implements, second gearing means for communicating power from the power input means to the PTO shaft and, a housing for holding the first and second gearing means as well as the PTO shaft. The transmission also has lubricating means for simultaneously lubricating the first and second gearing means, the PTO shaft and an intermediate shaft.

16 Claims, 4 Drawing Sheets

INTERNAL POWER TAKE-OFF SHAFT

BACKGROUND OF THE INVENTION

1. Field of Invention

This invention pertains to the art of methods and apparatuses for vehicle transmissions, and more specifically to methods and apparatuses for a transmission having a power take-off (PTO) shaft located within the transmission housing.

2. Description of the Related Art

It is known to provide vehicles such as lawn and garden tractors with power take-off (PTO) shafts. PTO shafts, which are typically operatively connected to the vehicle's transmission, are used to provide power for an associated implement such as a mower, a tiller, a cultivator or other implements.

A common problem encountered in the art is that PTO shafts require lubrication separate from the transmission lubrication system. This is undesirable, as it requires separate lubricating fluid, separate maintenance, etc.

Another problem encountered in the art is that PTO shafts typically only rotate, and therefore provide power, at one output speed. Different implements which are powered by PTO shafts, however, typically require different output speeds.

The present invention provides methods and apparatuses for eliminating these problems. The difficulties inherent in the art are therefore overcome in a way that is simple and efficient, while providing better and more advantageous results.

SUMMARY OF THE INVENTION

According to one aspect of the present invention, there is provided a transmission for use with an associated vehicle having an engine and a drive axle. The transmission has power input means for receiving power from the engine, first gearing means for communicating power from the power input means to the drive axle, a PTO shaft having first and second ends for use in selectively driving first and second associated implements, second gearing means for communicating power from the power input means to the PTO shaft and, a housing for holding the first and second gearing means as well as the PTO shaft.

According to another aspect of the present invention, the transmission also includes a hydrostatic unit that receives power from the power input means and provides power to the first gearing means, an intermediate shaft that communicates power from the power input means to the hydrostatic unit and the second gearing means and, lubricating means for simultaneously lubricating the first and second gearing means, the PTO shaft and the intermediate shaft.

According to another aspect of the present invention, there is furnished a method of selectively providing power to drive first and second associated implements through a transmission mounted on a vehicle. The vehicle has an engine and a drive axle. The transmission has a housing and power input means for receiving power from the engine. The engine is run and the power input means receives power from it. Power is then communicated to an intermediate shaft that is rotated. Power is communicated from the intermediate shaft to first and second gearing means. The first gearing means provides power to the drive axle. The second gearing means provides power to the PTO shaft that is rotated. The PTO shaft has first and second ends each of which is selectively operatively connectable to an associated implement.

On advantage of the present invention is that the PTO shaft is located within the transmission housing. Thus, the transmission lubricating means simultaneously lubricates the first and second gearing means, the intermediate shaft and the PTO shaft.

Another advantage of the invention is the PTO shaft provides power from both of its ends for associated implements. When an add-on kit, as will be described later in this document, is added, the PTO shaft provides one speed at a first end and a second speed at a second end.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
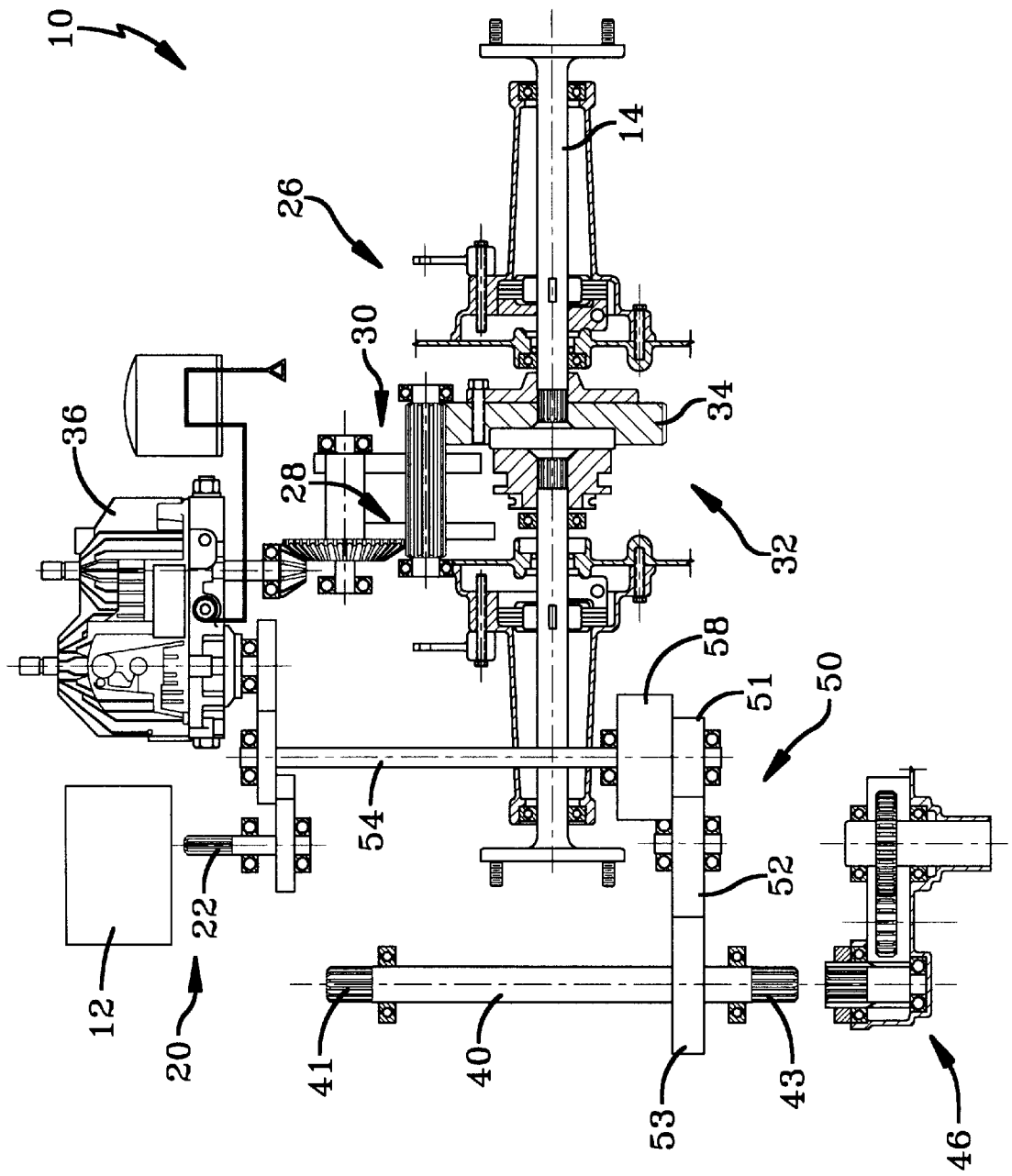
FIG. 1 is a schematic diagram of the transmission of this invention illustrating the add-on kit.

Referring now to the drawings wherein the showings are for purposes of illustrating a preferred embodiment of the invention only and not for purposes of limiting the same, FIGS. 1–4 show the transmission 10 of this invention. The transmission 10 is for use with an associated vehicle having an engine 12 and a drive axle 14 that is used to propel the vehicle. The engine 12 can be of any type chosen with sound engineering judgment and is therefore represented by a box. The drive axle 14 also can be of any type chosen with sound engineering judgment. In this preferred embodiment, the transmission 10 is used with a lawn and garden tractor (not shown) but it is useful with other types of vehicles as well.

Figure 2:
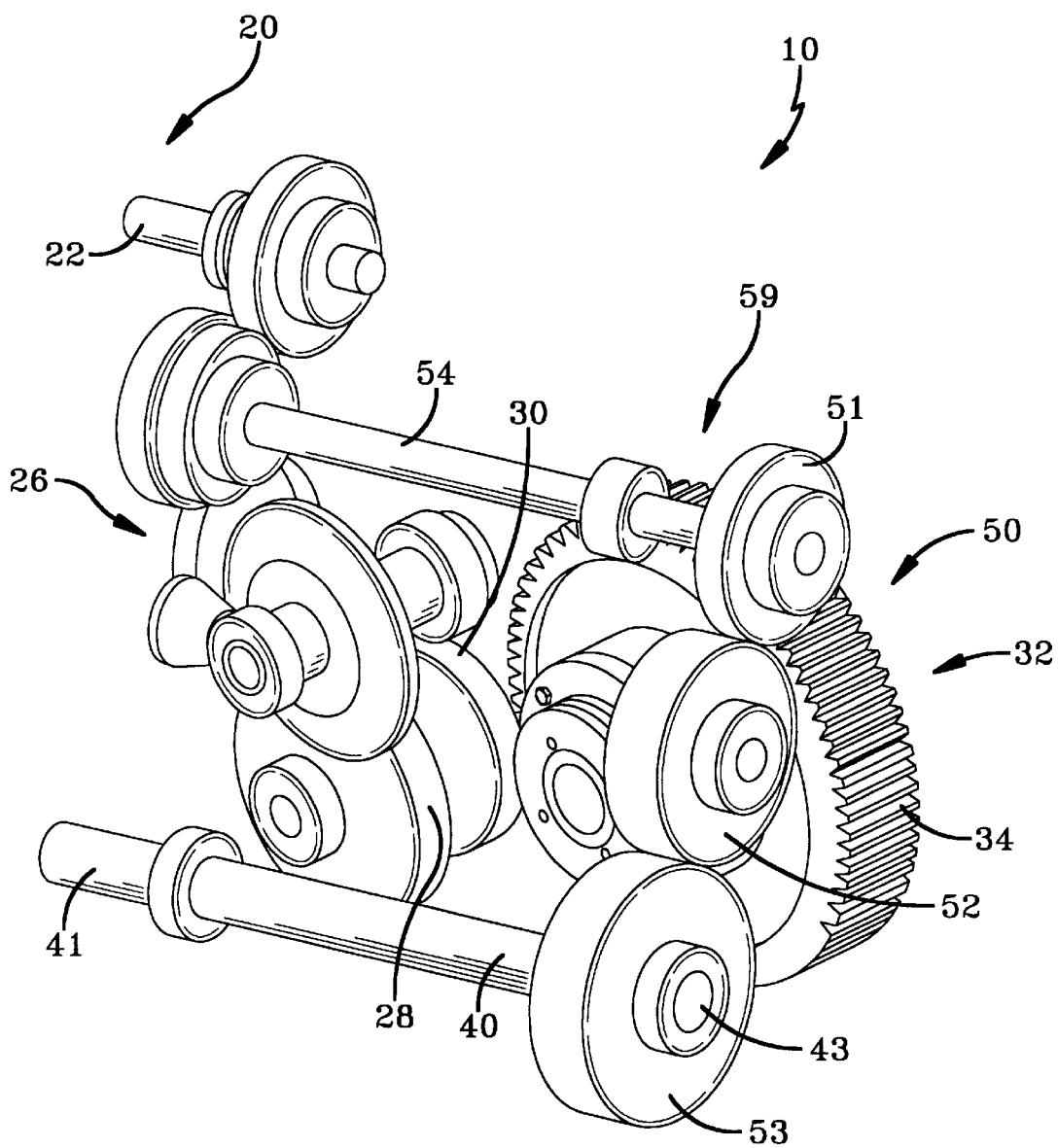
FIG. 2 is a perspective side view illustrated with the housing removed in order to show the intermediate shaft and the PTO shaft.
Figure 4:
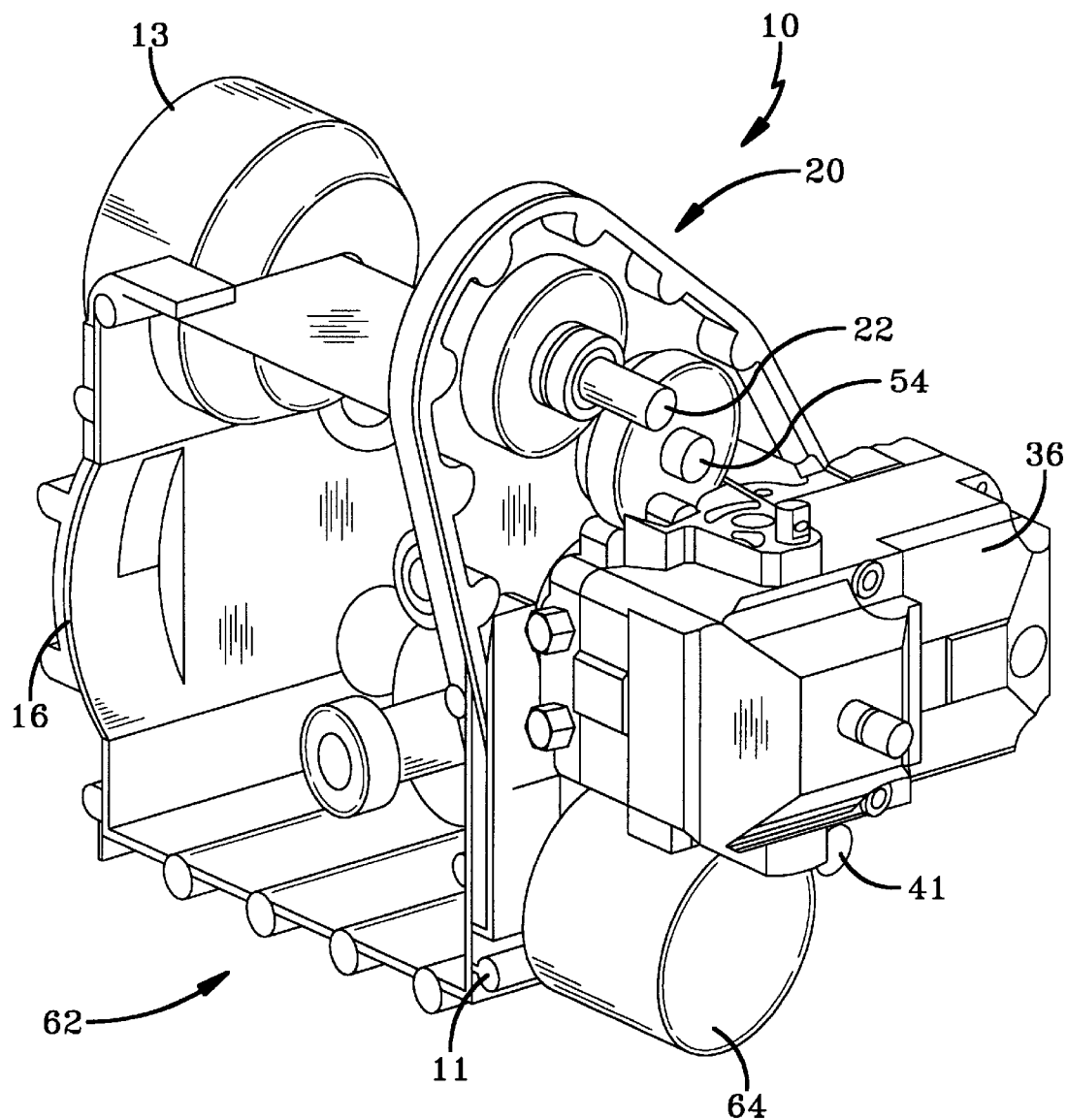
FIG. 4 is a perspective front view showing the hydrostatic unit, the lubricating means and the power input means.

With reference to FIGS. 1–2 and 4, the transmission 10 includes power input means 20 which operatively connects to and receives power from engine 12 as is known in the art. Preferably the power input means 20 is an input shaft 22. First gearing means 26 is used to communicate power from the input shaft 22 to the drive axle 14. First gearing means 26 can include any combination of shafts, gears and the like chosen with sound engineering judgment but in this preferred embodiment comprises a low gear ratio 28 and a high gear ratio 30. First gearing means 26 in this embodiment also has a differential 32 including bull gear 34 as is commonly known in the art. In this preferred embodiment, a hydrostatic unit 36 is also used. The hydrostatic unit 36 is commercially available and can be of any type chosen with sound engineering judgment. It should be noted that a hydrostatic unit is not necessary for this invention. Hydrostatic unit 36 receives power from the input shaft 22 and provides power to the first gearing means 26 as is known in the art.

With reference to FIGS. 1–4, transmission 10 also includes a power take-off (PTO) shaft 40 having first and second ends 41, 43 available to the front 11 and back 13 of the transmission 10 respectively. PTO shafts, as is commonly known in the art, are used to drive associated implements (not shown) such as mowers, tillers, cultivators and other such implements. First and second ends 41, 43 of PTO shaft 40 are both selectively available for being operatively connected to an associated implement. Preferably, as shown in FIG. 1, first and second ends 41, 43 are splined. As is commonly known in the art, some implements require different driving speeds that others. Lawn mowers, for example, often require a shaft that provides a speed of 2000 rotations per minute (rpm) while tillers often require a shaft that provides a speed of 540 rpm. To meet this need for two speeds, an add-on kit 46 according to the invention can be selectively connected to the second end 43 of PTO shaft. The add-on kit 46 is used to convert the speed of the PTO shaft 40 to a different speed. In this preferred embodiment PTO shaft 40 is rotated at a first speed RPM1 for example 2000 rpm or an rpm within the range of 1900 rpm to 2100 rpm. First end 41 of the PTO shaft 40 provides the same first speed RPM1 for an implement. Add-on kit 46 converts the first speed RPM1 to a second speed RPM2, for example 540 rpm within the range of 440 rpm to 640 rpm.

With reference to FIGS. 1–4, second gearing means 50 communicates power from the input shaft 22 to the PTO shaft 40. Second gearing means 50 can include any combination of shafts, gears and the like chosen with sound engineering judgment but in this preferred embodiment comprises first, second and third gears 51, 52, 53 arranged in series. Preferably, intermediate shaft 54 communicates power from power input means 20 to first and second gearing means 26, 50. In this embodiment, intermediate shaft 54 provides power to hydrostatic unit 36 that in turn provides power to first gearing means 26. Preferably, second gearing means 50 includes a clutch 58. Clutch 58 is used to selectively engage and disengage the PTO shaft 40 from the power input means 20. Clutch 58 can be any type chosen with sound engineering judgment. In this preferred embodiment, clutch 58 is located on the intermediate shaft 54. In FIG. 2 clutch 58 is not shown but its location is indicated by reference character 59.

Figure 3:
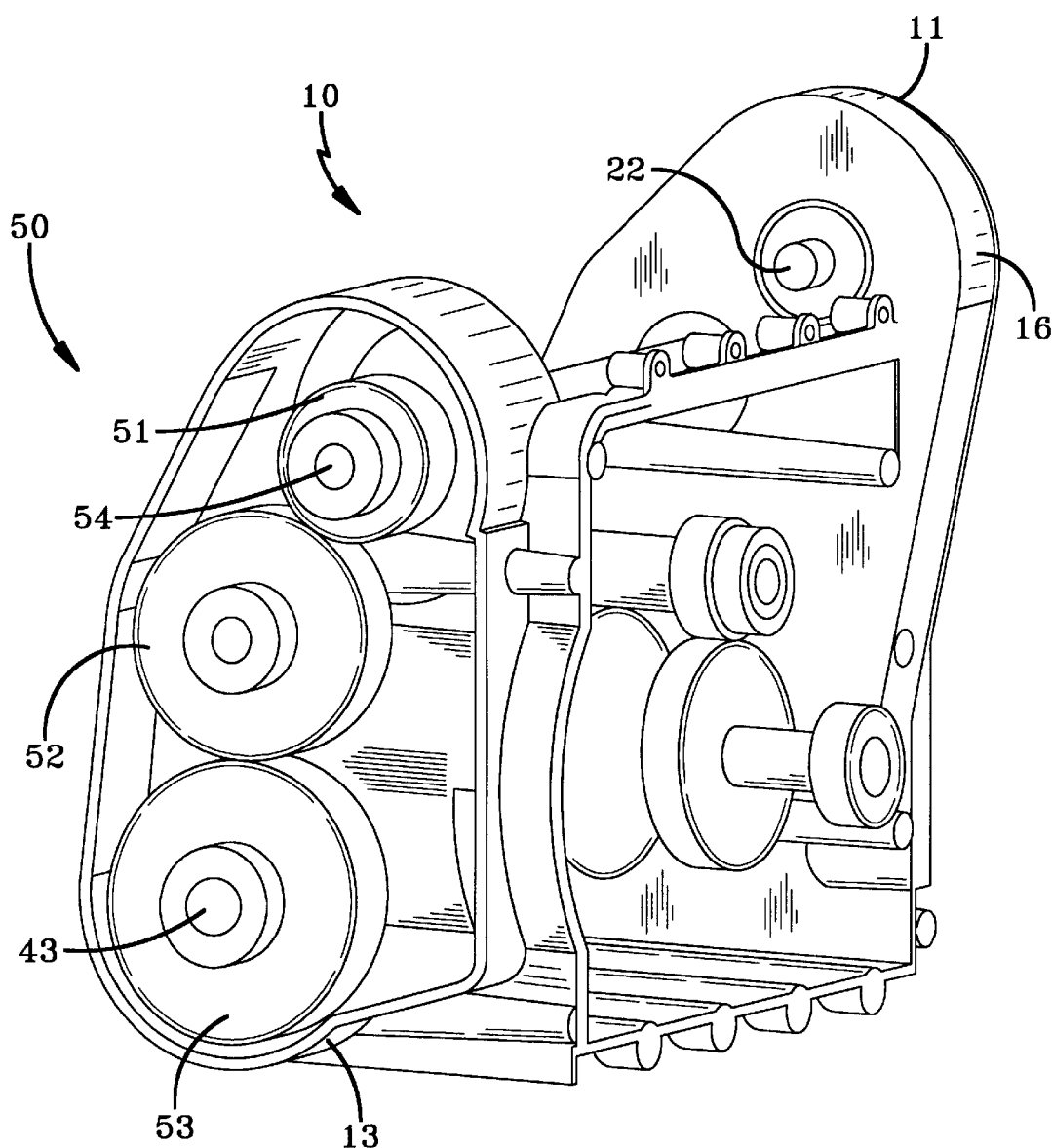
FIG. 3 is a perspective back view showing the second gearing means and the second end of the PTO shaft.

With reference now to FIGS. 2–4, transmission 10 has a housing 16. Housing 16 holds within it first and second gearing means 26, 50, the PTO shaft 40 and intermediate shaft 54. Lubricating means 62, including oil filter 64, is provided to lubricate everything within housing 16. Lubricating means 62 can therefore simultaneously lubricate first and second gearing means 26, 50, the PTO shaft 40 and intermediate shaft 54. It should be noted that while the alignments of all the components of transmission 10 can be any chosen with sound engineering judgment, preferably input shaft 22, intermediate shaft 54 and PTO shaft 40 are parallel.

With reference to FIGS. 1–4 in operation of transmission 10, engine 12 is run and power input means 20 receives power from it. Power is then communicated to intermediate shaft 54 that is rotated as a result. Power is communicated from intermediate shaft 54 to hydrostatic unit 36 that in turn provides power to first gearing means 26. The first gearing means 26 provides power to the drive axle 14. Power is also communicated from intermediate shaft 54 to second gearing means 50 when clutch 58 is selectively engaged. Second gearing means 50 then communicates power to PTO shaft 40 that is rotated at first speed RPM1. This provides the same first speed RPM1 to first end 41 for selective operative connectability to a first associated implement (not shown). First speed RPM1 is converted by add-on kit 46 to second speed RPM2 for selective operative connectability to a second associated implement (not shown).

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention,
What is claimed is:

1. A transmission for use with an associated vehicle, the associated vehicle having an engine and a drive axle, said transmission comprising:

power input means for receiving power from the engine;

first gearing means for communicating power from said power input means to the drive axle;

a PTO shaft having first and second ends, said first and second ends for use in selectively driving first and second associated implements respectively;

second gearing means for communicating power from said power input means to said PTO shaft;

a housing, said first and second gearing means being located within said housing said PTO shaft also being located within said housing; and, an intermediate shaft, said intermediate shaft communicating power from said power input means to said first and second gearing means;

a hydrostatic unit, said hydrostatic unit receiving power from said power input means, said hydrostatic unit providing power to said first gearing means.

2. A transmission for use with an associated vehicle, the associated vehicle having an engine and a drive axle, said transmission comprising:

power input means for receiving power from the engine;

first gearing means for communicating power from said power input means to the drive axle;

a PTO shaft having first and second ends, said first and second ends for use in selectively driving first and second associated implements respectively;

second gearing means for communicating power from said power input means to said PTO shaft;

a housing, said first and second gearing means being located within said housing, said PTO shaft also being located within said housing; and, a hydrostatic unit, said hydrostatic unit receiving power from said power input means, said hydrostatic unit providing power to said first gearing means.

3. The transmission of claim 2 further comprising:

lubricating means for simultaneously lubricating said first and second gearing means and said PTO shaft.

4. The transmission of claim 2 wherein said first and second ends of said PTO shaft are splined.

5. The transmission or claim 1 wherein said second gearing means further comprises:

a clutch, said clutch selectively disengaging said PTO shaft.

6. The transmission of claim 2 further comprising:

an add-on kit, said add-on kit selectively operatively connectable to said second end of said PTO shaft, said first end of said PTO, shaft for use in selectively driving a first associated implement at a first speed RPM1, said add-on kit for use in selectively driving a second associated implement at a second speed RPM2.

7. The transmission of claim 6 wherein RPM1 is within the range of 1900 rpm to 2100 rpm and RPM2 is within the range of 440 rpm and 640 rpm.

8. A transmission for use with an associated vehicle, the associated vehicle having an engine and a drive axle, said transmission comprising:

power input means for receiving power from the engine;

first gearing means for communicating power to the drive axle;

a hydrostatic unit, said hydrostatic unit receiving power from said power input means, said hydrostatic unit providing power to said first gearing means;

a PTO shaft having first and second ends, said first and second ends for use in selectively driving first and second associated implements respectively;

second gearing means for communicating power from said power input means to said PTO shaft;

an intermediate shaft, said intermediate shaft communicating power from said power input means to said hydrostatic unit and said second gearing means;

a housing, said first and second gearing means, said PTO shaft and said intermediate shaft being located within said housing; and, lubricating means for simultaneously lubricating said first and second gearing means, said PTO shaft and said intermediate shaft.

9. The transmission of claim 8 wherein said housing has front and back ends and said intermediate shaft has first and second ends, said first ends of said intermediate shaft and said PTO shaft extending through said front end of said housing, said second ends of said intermediate shaft and said PTO shaft extending through said back end of said housing.

10. The transmission of claim 8 further comprising:

an add-on kit, said add-on kit selectively operatively connectable to said second end of said PTO shaft, said first end of said PTO shaft for use in selectively driving a first associated implement at a first speed RPM1, said add-on kit for use in selectively driving a second associated implement at a second speed RPM2, said first speed RPM1 being within the range of 1900 rpm to 2100 rpm, said second speed RPM2 being within the range of 440 rpm and 640 rpm.

11. The transmission of claim 10 wherein said power input means comprises:

an input shaft, said input shaft, said PTO shaft and said intermediate shaft being substantially parallel.

12. The transmission of claim 11 wherein said second gearing means comprises:

first, second and third gears arranged in series.

13. A method of selectively providing power to drive first and second associated implements, the method comprising the steps of:

providing a vehicle having an engine, a transmission and a drive axle;

providing the transmission with power input means for receiving power from the engine, an intermediate shaft, first gearing means, second gearing means, a PTO shaft and a housing;

locating the intermediate shaft, first gearing means, second gearing means and PTO shaft within the housing;

running the engine;

receiving power from the engine into the power input means;

communicating power from the power input means to the intermediate shaft;

rotating the intermediate shaft;

communicating power from the intermediate shaft to the first gearing means;

communicating power from the first gearing means to the drive axle;

communicating power from the intermediate shaft to the second gearing means;

communicating power from the second gearing means to the PTO shaft having first and second ends;

rotating the PTO shaft;

providing the first end of the PTO shaft for selective operative connectability to the first associated implement; and, providing the second end of the PTO shaft for selective operative connectability to the second associated implement.

14. The method of claim 13 after the step of communicating power from said intermediate shaft to a second gearing means located within the housing having the step of:

engaging a clutch, said clutch selectively permitting power to communicate between said intermediate shaft and said second gearing means.

15. The method of claim 13 wherein said PTO shaft rotates at a speed RPM1, the method before the step of providing said second end of said PTO shaft for selective operative connectability to a second associated implement having the steps of:

connecting an add-on kit to said second end of said PTO shaft; and, rotating said add-on kit at a speed RPM2, said speed RPM 1 being within the range of 1900 rpm to 2100 rpm, said speed RPM2 being within the range of 440 rpm and 640 rpm.

16. The method of claim 13 after the step of rotating said intermediate shaft having the steps of:

communicating power from said intermediate shaft to a hydrostatic unit; and, communicating power from said hydrostatic unit to said first gearing means.

* * * * *